United States Patent [19]
DeCarlo

[11] Patent Number: 5,442,722
[45] Date of Patent: Aug. 15, 1995

[54] OPTICAL FIBER RIBBON WITH ZIP CORD

[75] Inventor: Michael G. DeCarlo, Hickory, N.C.

[73] Assignee: Siecor Corporation, Hickory, N.C.

[21] Appl. No.: 279,612

[22] Filed: Jul. 25, 1994

[51] Int. Cl.⁶ .................................................. G02B 6/44
[52] U.S. Cl. .................................................... 385/114
[58] Field of Search ................................. 385/100–114

[56] References Cited

U.S. PATENT DOCUMENTS

| | | | |
|---|---|---|---|
| 1,984,038 | 12/1934 | Shaw et al. | 174/113 R |
| 2,628,998 | 2/1953 | Frisbie | 174/112 |
| 2,729,696 | 1/1956 | Mapelsden et al. | 174/117 F |
| 2,927,952 | 3/1960 | Wermine | 174/27 |
| 3,715,458 | 2/1973 | Bayes et al. | 174/113 R |
| 3,748,371 | 7/1973 | Krook et al. | 174/70 R |
| 4,041,237 | 8/1977 | Stine | 174/36 |
| 4,159,394 | 6/1979 | Ross | 174/72 TR |
| 4,190,319 | 2/1980 | Eggleston | 385/114 |
| 4,368,214 | 1/1983 | Gillette | 156/51 |
| 4,467,138 | 8/1984 | Brorein | 385/103 |
| 4,715,677 | 12/1987 | Saito et al. | 385/114 |
| 4,729,628 | 3/1988 | Kraft | 385/104 |
| 4,815,814 | 3/1989 | Ulijasz | 385/114 |
| 5,062,685 | 11/1991 | Cain et al. | 385/114 |
| 5,180,890 | 1/1993 | Pendergrass et al. | 385/103 |
| 5,276,759 | 1/1994 | Nguyen et al. | 385/114 |

FOREIGN PATENT DOCUMENTS

| | | | |
|---|---|---|---|
| 1048619 | 10/1954 | Germany . | |
| 1-138516 | 5/1989 | Japan | 385/114 |
| 0251005 | 10/1989 | Japan | 385/114 |

Primary Examiner—Rodney B. Bovernick
Assistant Examiner—J. Ngo
Attorney, Agent, or Firm—J. David Abernethy

[57] ABSTRACT

Disclosed is a fiber optic ribbon containing a plurality of optical fibers and at least one high tensile strength zip cord (or ripcord) all aligned one to another in a planar relationship and disposed in a plastic matrix, the zip cord being spaced apart from the surfaces of laterally disposed optical fibers to the extent that when the zipcord is pulled against the plastic matrix the plastic matrix is cut and thus separates the optical fibers into two or more groups, without exposing the optical fibers.

6 Claims, 2 Drawing Sheets

OPTICAL FIBER RIBBON WITH ZIP CORD

FIELD OF THE INVENTION

The invention deals with optical fiber ribbon units having a zip cord (also called ripcord) adapted to provide an easy way to divide the fibers in the ribbon into two or more groups.

DESCRIPTION OF THE PRIOR ART

Ripcords are well known in the prior art for both electric as well as for optical cable wherein a cord of suitable tensile strength is placed in a predetermined location within a cable structure (usually a round cable), so as to provide a suitable device for craftsmen to cut that portion of the cable lying above the ripcord and thus expose certain desired elements of the cable. See for example a ripcord for electric conductors such as that shown in German Patent 1,048,619.

With respect to fiber optic cable, presently there is a great deal of interest in fiber optic ribbons, as opposed to loose tube and/or tight buffered optical fibers. More particularly, there is interest in stacks of optical fiber ribbons, an example of which is disclosed by Eoll in U.S. Pat. No. 5,212,756 the contents of which are incorporated herein by reference.

Disclosed in FIG. 2F and 2G of U.S. Pat. No. 4,715,677 (incorporated herein by reference), is a fiber optic ribbon unit, which comprises a plurality of optical fibers 10 in a planar relation with one another circumscribed by a plastic matrix 19. Disposed adjacent to each optical fiber 19 are Kevlar fibers 39 that act as a strength and a cushioning means. As a result of the positioning of the Kevlar multi-filament 39 against optical fiber 10, pulling on the multi-filament fiber will cut plastic matrix 19 and by so doing will expose the outer surface optical fiber 10. This is undesirable. When an optical fiber ribbon unit is divided into two or more groups, it is desirable that no optical fibers be exposed because a terminating end portion of the optical fiber unit must be traversed into termination boxes, where exposed optical fibers most assuredly would come into undesirable contact with the sidewalls of the termination box. Therefore the teaching of U.S. Pat. No. 4,715,677 is not directed towards nor solves the problem that which the instant invention solves, i.e. an optical fiber ribbon that contains a zip cord embedded in the ribbon plastic matrix in such a position relative to the optical fibers in the ribbon that permits the optical fiber ribbon to be divided into two or more groups of fibers without exposing such fibers.

Shown by element 1 of FIG. 1 is a prior art method of preparing a fiber optic ribbon so that it can be divided into two or more groups. Such is achieved by molding a "necked down" area in the ribbon plastic matrix 4 where it is anticipated the dividing is sought to be achieved. Sometimes this works, other times it does not depending on the precision of molding the plastic matrix in precisely the right spot relative to fibers 2. Another prior art method is to divide the fibers 2 into groups by cutting the matrix 3 with a knife or razor blade. Such a method is not always sufficient to perform the separation without cutting too close to fibers 2 so as to expose them. The present invention avoids these problems.

SUMMARY OF THE INVENTION

The invention is an optical fiber unit comprising: (a) a plurality of optical fibers aligned to one another in a planar relationship bound together in such relationship by a plastic matrix circumscribing same; and (b) one or more zip cords disposed in the plastic matrix having a tensile strength sufficient to cut the plastic matrix when pulled against it and so positioned in the plastic matrix so as to be adapted to separate one group of optical fibers from another group. The zip cord is spaced apart from adjacent optical fibers to the extent that pulling on the zip cord and cutting the plastic matrix does not expose any optical fiber. Optical fibers in any one group may be spaced apart from or in contact with one another, but between groups adjacent fibers are spaced apart from the zip cord as described.

DETAILED DESCRIPTION OF THE INVENTION

Figure 1:
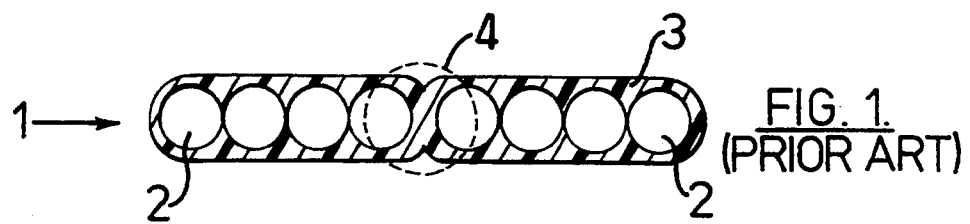
FIG. 1 is a cross sectional view of a prior art method of providing a means (neck down area) to provide a means of separating a fiber optic ribbon into two groups.

In FIG. 1 there is shown as element 1, a cross-sectional view of a prior art optical fiber ribbon containing optical fibers 2 aligned with one another in a planar fashion and fixed in such planar relationship by circumscribing plastic 3. In plastic coating 3 there is a necked-down position 4, which is a zone of weakness, adapted to be used to break apart fibers 2 into two groups of 4 fibers each.

Figure 2:
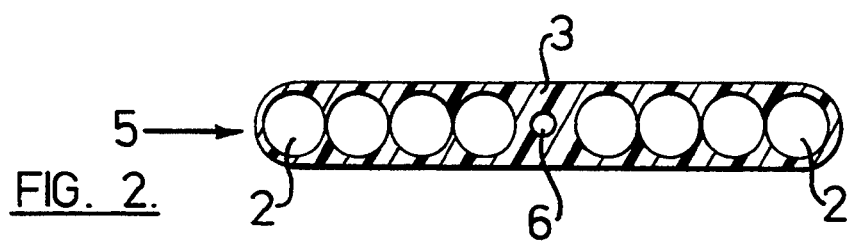
FIG. 2 is a cross sectional view of fiber optic ribbon with a zip cord adapted to divide a ribbon into two groups.
Figure 4:
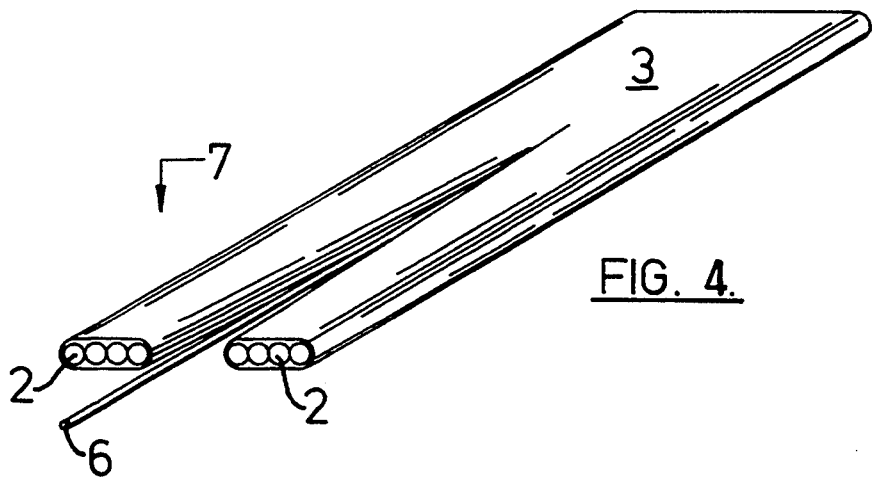
FIG. 4 is an isometric view of an optical fiber ribbon divided into two groups by means of a zip cord as shown by FIG. 2.
Figure 5:
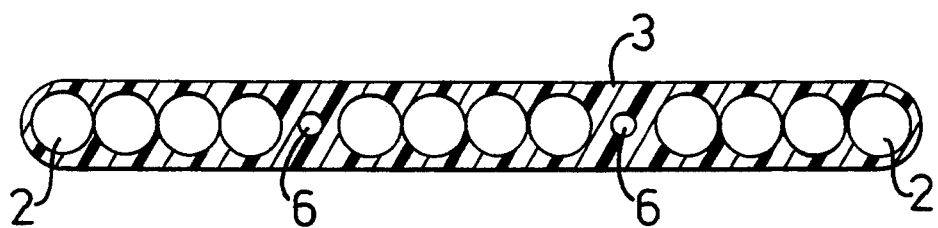
FIGS. 5, 6, and 7 are cross-sectional views of various embodiments of the present invention.
Figure 6:
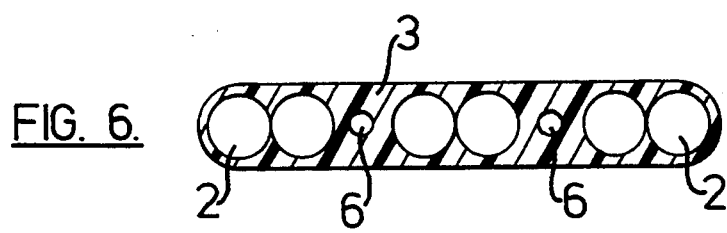
Figure 7:
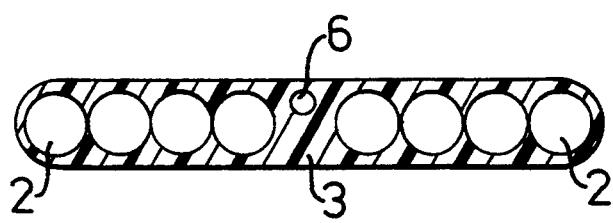

In FIG. 2 there is shown a cross-sectional view of the invention shown as element 5. It has the same aligned optical fibers as prior art fiber optic ribbon; however, the circumscribing plastic 3 has no necked-down section. Instead, there is a zip cord 6 made of yarns of polyamide, nylon, polyvinyl chloride, polyester threads, graphite and/or glass. Positioning of zip cord 6 is critical because it must be disposed in plastic matrix 3 in such a manner that when it is pulled against plastic matrix 3, the matrix is cut therefore facilitating the division of one group of optical fibers from another group without exposing any part of the surfaces of any optical fiber in any group, as shown in FIG. 4.

Figure 3:
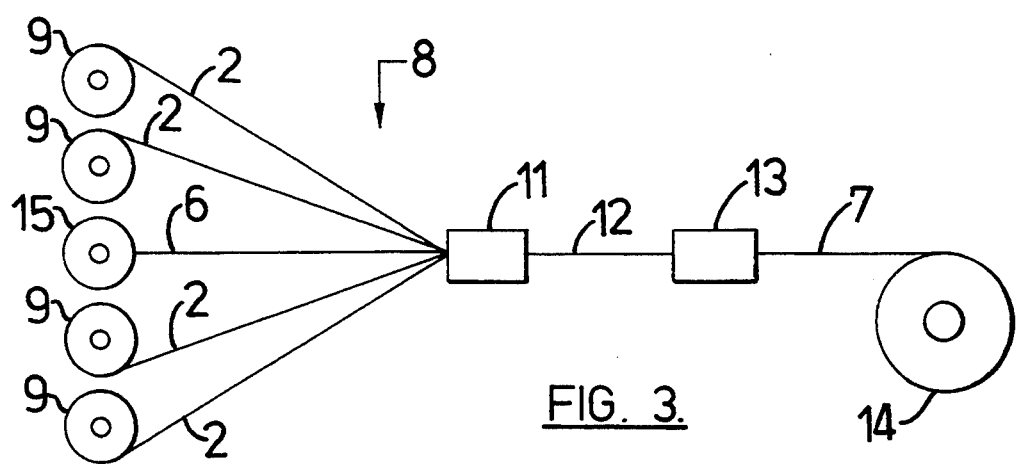
FIG. 3 is a block diagram of the apparatus and process of making the subject invention.
Figure 8:
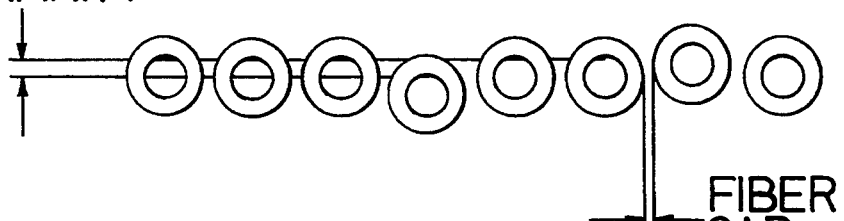
FIG. 8 is a cross-sectional view of optical fibers aligned in an improper planar relationship.

Shown by element 8 of FIG. 3 is a schematic diagram of the apparatus and process of making the subject invention. Pay off reels 9 contain wound thereon optical fibers 2 as received from the manufacturer such as Corning Incorporated. Such fibers typically are circumscribed by two coats of a urethane acrylate. Pay off reel 15 contains zip cord 6 and is fed into alignment means 11 simultaneously with optical fibers 2. Alignment means 11 is a device that can receive a plurality of fibers, each fiber positioned differently from other fibers in three dimensional space and align such fibers, 2 and 6 in the instant case, in a planar relationship like that of FIGS. 2 and 10. In the example shown, alignment means 11 causes fibers 2—2 to be laterally disposed relative to zip cord 6 (Kevlar) and in a planar relationship thereto. See also FIG. 8. Furthermore, the two optical fibers 2 nearest to and laterally disposed to zip cord 6 are spaced apart from zip cord 6 to the extent that when zip cord 6 is pulled against plastic matrix 3, the matrix is cut but leaves a coating of plastic matrix 3 covering optical fiber 2. That is to say, no surface of optical fibers themselves and/or their urethane acrylate coating are exposed.

In addition, the alignment device 11 should be able to hold the individual fibers in a planar relationship such that fiber planarity is less than 20 μm. The gaps between optical fiber 2 and zip cord 6 will vary depending on the size of fiber and zip cord used. It should be designed so that the alignment guide can maintain a gap between the outer surface of the zip cord and the outer surfaces of the adjacent optical fibers so that cutting the plastic matrix 3 with zip cord 6 will not expose the outer surface of optical fibers 2.

The aligned fibers and zip cord 12 are then traversed into a die means 13, where plastic matrix 13 is applied and cured. Curing can be by cross-linking if plastic matrix 3 is cross-linkable or cooled to a solid state if the plastic matrix is a thermoplastic resin. A suitable cross-linkable material would be matrix coating 314-200-5 obtained from Borden, Inc. of Cincinnati, Ohio or if thermoplastic, a suitable resin would be one obtainable from Dow Chemical Company or Exxon Corporation. In the later use (thermoplastic resin is used) element 13 would be a commercially available extrusion crosshead. After curing, the finished product 7 is wound on take up reel 14.

A variety of modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A fiber optic cable subunit comprising:
   (a) an optical ribbon comprising a plurality of optical fibers aligned one to another in a planar relationship bound together in said relationship by a circumscribing plastic matrix in which the optical fibers are embedded; and,
   (b) one or more zip cords disposed in said plastic matrix aligned with said plurality of optical fibers having sufficient tensile strength to cut said plastic matrix when said zip cord is pulled against said plastic matrix resulting in the separation of one group of optical fibers from another group of optical fibers, said zip cord positioned in said plastic matrix and aligned with and spaced apart from the outer surfaces of laterally disposed optical fibers to the extent the outer surfaces of said laterally disposed optical fibers are not exposed by the zip cord cutting said plastic matrix.

2. The fiber optic ribbon of claim 1 wherein said zip cord is made from material selected from the group consisting of polyvinyl chloride, nylon, polyesters, polyamide, graphite, and glass.

3. The fiber optic ribbon of claim 1 wherein said zip cord is made from strands of Kevlar.

4. The fiber optic ribbon of claim 1 wherein the plastic matrix is sufficiently weak so as to permit the zip cord to cut through the plastic matrix without breaking the zip cord.

5. A method of making a fiber optic cable subunit comprising the steps of:
   (a) providing a plurality of optical fibers and at least one flexible zip cord and aligning said optical fibers and at least one flexible zip cord in a planar relationship one to another; and
   (b) forming an optical ribbon by embedding said assigned optical fibers and at least one flexible zip cord in a plastic matrix adapted to be cut by said at least one zip cord, said at least one flexible zip cord being so disposed in said plastic matrix and spaced apart from laterally disposed optical fibers to the extent that cutting said plastic matrix by pulling said at least one flexible zip cord the optical fibers are divided into at least two groups and the surfaces of said optical fibers are not exposed.

6. The method of claim 5 wherein said at least one or more zip cords are made from elongated strands of yarns selected from the group consisting of glass, Kevlar, carbon and graphite yarns.

* * * * *